United States Patent
De Vries

(10) Patent No.: US 8,555,606 B2
(45) Date of Patent: Oct. 15, 2013

(54) AGRICULTURAL MACHINE MOVABLE BETWEEN A LATERAL TRANSPORT POSITION AND AN OPERATIVE POSITION

(75) Inventor: Sjoerd Sieger De Vries, Hallum (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/330,706

(22) Filed: Dec. 20, 2011

(65) Prior Publication Data

US 2012/0085075 A1    Apr. 12, 2012

Related U.S. Application Data

(63) Continuation of application No. PCT/NL2010/000089, filed on May 26, 2010.

(30) Foreign Application Priority Data

Jun. 26, 2009 (NL) .................................... 1037078

(51) Int. Cl.
*A01D 34/64* (2006.01)
*A01B 73/00* (2006.01)

(52) U.S. Cl.
USPC ................................ 56/15.5; 56/218; 56/228

(58) Field of Classification Search
USPC ............... 56/14.9, 15.1, 15.5, 15.7, 365, 378, 56/15.3, 15.4, 228, 218, 15.2, 15.6, 56/DIG. 14
See application file for complete search history.

(56) References Cited

U.S. PATENT DOCUMENTS

| | | | |
|---|---|---|---|
| 5,272,859 A * | 12/1993 | Pruitt et al. | 56/15.2 |
| 5,901,533 A | 5/1999 | Ermacora et al. | |
| 5,964,076 A * | 10/1999 | Loehr | 56/6 |
| 6,003,291 A * | 12/1999 | Ermacora et al. | 56/6 |

(Continued)

FOREIGN PATENT DOCUMENTS

| | | |
|---|---|---|
| DE | 202007015176 U1 | 4/2009 |
| EP | 269166 A1 | 6/1988 |
| EP | 800757 A1 | 10/1997 |
| FR | 2759531 A1 | 8/1998 |

OTHER PUBLICATIONS

International Search Report of PCT/NL2010/000089 issued on Oct. 28, 2010.

*Primary Examiner* — Thomas B Will
*Assistant Examiner* — Joan D Misa
(74) *Attorney, Agent, or Firm* — Hoyng Monegier LLP; Coraline J. Haitjema; David P. Owen

(57) ABSTRACT

An argricultural machine for lateral displacement has a fastening device fastened to a pulling vehicle, a frame, an implement to be fastened to the frame, a hingeable drawbar, and an actuator provided between the frame and the drawbar. The actuator moves the frame between at least a transport position behind the fastening device and an operative position laterally of the fastening device. A telescopic drive shaft is situated between the fastening device and the implement, wherein a first end of the shaft is connected to the fastening device and a second end of the shaft is connected to the implement. The argricultural machine further has a steering device to direct the first shaft part of the telescopic drive shaft substantially to the second shaft end of the telescopic drive shaft.

10 Claims, 3 Drawing Sheets

(56) References Cited

U.S. PATENT DOCUMENTS

| | | | |
|---|---|---|---|
| 6,044,633 A * | 4/2000 | Stiefvater et al. | 56/16.4 R |
| 6,055,800 A | 5/2000 | Walch | |
| 6,182,427 B1 * | 2/2001 | Loehr | 56/6 |
| 6,189,306 B1 * | 2/2001 | Walch | 56/15.1 |
| 6,662,540 B1 * | 12/2003 | Harkcom et al. | 56/228 |
| 7,047,714 B1 * | 5/2006 | Stephenson et al. | 56/15.2 |
| 7,207,166 B2 * | 4/2007 | Stephenson | 56/15.2 |
| 7,596,935 B2 * | 10/2009 | Bollinger et al. | 56/14.9 |
| 7,966,794 B2 * | 6/2011 | Thompson et al. | 56/15.8 |
| 2011/0219738 A1 * | 9/2011 | Thompson | 56/13.5 |

\* cited by examiner

AGRICULTURAL MACHINE MOVABLE BETWEEN A LATERAL TRANSPORT POSITION AND AN OPERATIVE POSITION

CROSS REFERENCE TO RELATED APPLICATIONS

This application is a continuation of PCT application number PCT/NL2010/000089 filed on 26 May 2010, which claims priority from Netherlands application number 1037078 filed on 26 Jun. 2009. Both applications are hereby incorporated by reference in their entireties.

BACKGROUND OF THE INVENTION

1. Field of the Invention

The invention relates to an agricultural machine according to the preamble of claim 1. Such an agricultural machine is used, for example, as a mower. An example of such a mower is the Splendimo 321 PC, which is marketed by Lely Group, Maassluis, Netherlands, which is hereby incorporated by reference in its entirety.

2. Description of the Related Art

In certain applications, it is desirable that an agricultural implement is moved laterally of a pulling vehicle. It is known to provide a hingeable drawbar which enables a lateral displacement of the implement with respect to the fastening point on the tractor. In this case, the agricultural machine remains operative in different lateral positions and during the displacement between these positions.

For example, during mowing with a mower of this type, the mowing device will be brought into the most lateral position during mowing, i.e. the mowing device will be positioned, with respect to the direction of travel, as far as possible beside the pulling vehicle. This position is also designated as operative position. In said operative position it is possible to mow a strip of crop without it being necessary for the pulling vehicle to move over said strip. This is, for example, advantageous when mowing a slanting strip, for example a side of a ditch.

However, if there are obstacles, such as poles or trees, on the strip to be mown, the mowing device should temporarily be positioned more behind or completely behind the pulling vehicle. During these lateral displacements of the mower, the mower remains operative, so that the mowing activities can be continued without delay.

A drawback of the known agricultural machine is that the hinge point of the drawbar on the frame and the hinge point of the drive shaft on the implement should be located substantially on the same vertical centre line, or at least that the hinge points of the drive shaft and the drawbar, when viewed in the customary direction of travel, are in alignment.

BRIEF SUMMARY OF THE INVENTION

It is an object of the invention to provide an agricultural machine, wherein said drawback is not present, or at least to provide an alternative agricultural machine. More particularly, the present invention provides an agricultural machine comprising:
  a fastening device which is to be fastened to a pulling vehicle in order to move the agricultural machine in a customary direction of travel (A),
  a frame,
  an implement fastened to the frame,
  an elongate drawbar which has a first end that is hingeably fastened to the fastening device and a second end that is hingeably fastened to the frame, and
  an actuator which is provided between the frame and the drawbar, in order to move the frame between at least a transport position in which the frame is located at least partly behind the fastening device in the customary direction of travel and an operative position in which the frame is located laterally of the fastening device in the customary direction of travel,
characterized in that the agricultural machine comprises:
  a telescopic drive shaft comprising a first shaft part which has a first shaft end of the telescopic drive shaft, and a second shaft part which is movable with respect to the first shaft part and which has a second shaft end of the telescopic drive shaft, wherein the first shaft end is connected to the fastening device and the second shaft end is connected to the implement, and
  a steering device which is configured to direct the first shaft part of the telescopic drive shaft substantially to the second shaft end of the telescopic drive shaft.

By providing a steering device which keeps the first shaft part directed to the second shaft end, the first shaft part and the second shaft part remain in alignment with each other. As a result thereof, the drive shaft remains drivable in case of a lateral displacement of the implement without a considerable chance of the drive shaft being damaged.

In this case it is not necessary for the hinge points of the second end of the drawbar and the second shaft end of the drive shaft to be positioned substantially above each other. As a result, the hinge point of the second end of the drawbar can be positioned closer to the rear side of the combination of frame and implement. This results in a more favourable relation between the hinge point of the drawbar, the centre of gravity of the combination of frame and implement, and the location of the wheels of the mowing machine, so that the stability of the agricultural machine is improved.

In one embodiment, the steering device comprises a steering rod which is hingeably connected with a first steering rod end to a support of the first shaft part, and with a second steering rod end to the frame. By providing a steering rod, a support of the first shaft part can be rotated in case of a lateral displacement of the frame, in which case the first shaft part remains directed to the second shaft end.

The support may be a bearing in which the first shaft part is rotatably supported, or a housing or the like which does not rotate along with the first shaft part.

In this case, the support is preferably provided with an arm which extends at least partly perpendicular to the longitudinal centre line of the drive shaft, to which arm the first steering rod end is hingeably fastened. By providing an arm on the support, the co-steering of the first shaft part can be effected in a simple manner.

In an alternative embodiment of a steering device, the steering device comprises a steering rod having a first end and a second end, wherein the second end is hingeably connected to the frame, and a steering yoke having a first yoke arm and a second yoke arm, wherein the steering yoke is hingeably fastened, between the first and the second yoke arm, to the drawbar, and wherein the first yoke arm is fastened to the first shaft part and the second yoke arm is hingeably coupled to the first end of the steering rod.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
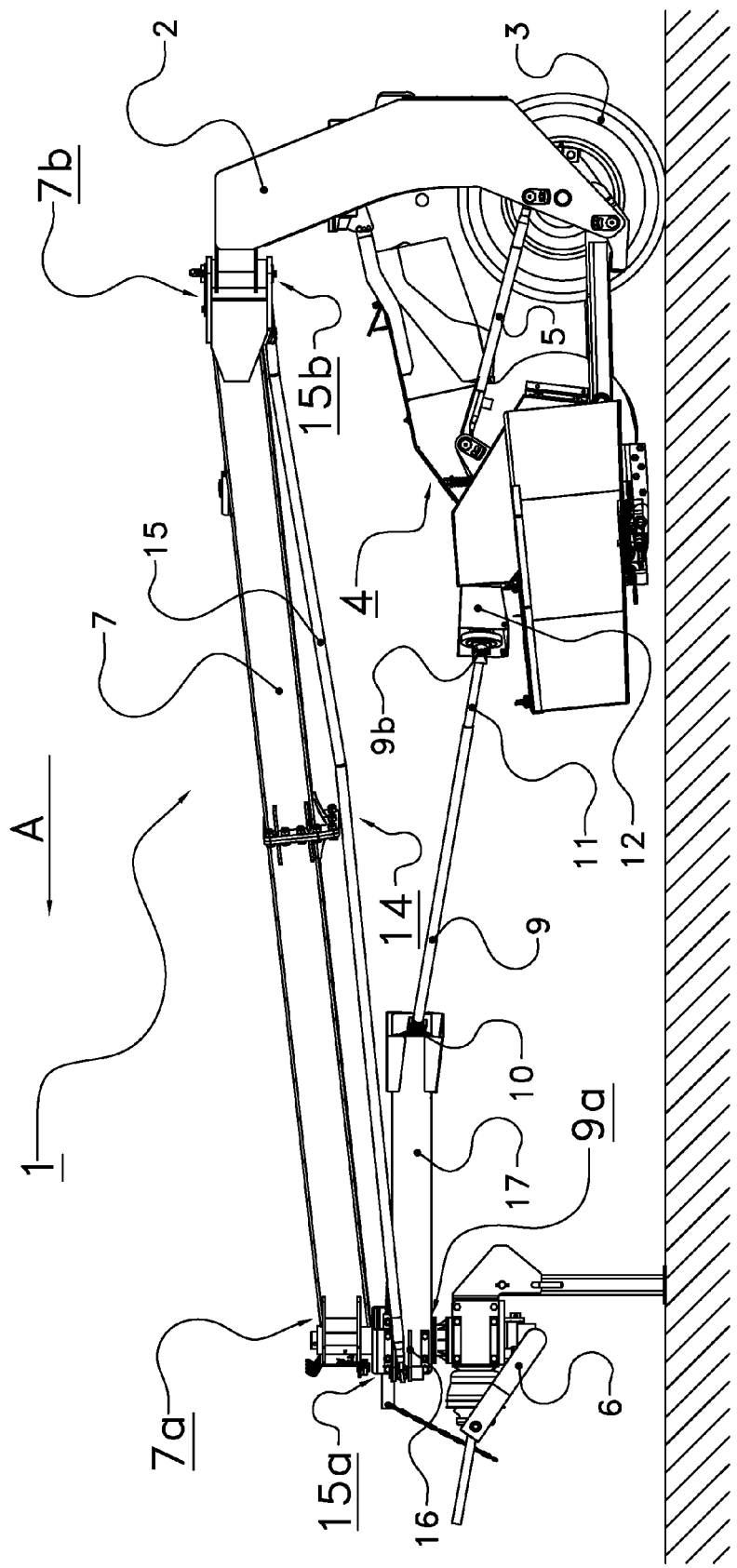
FIG. 1 shows a side view of an embodiment of an agricultural machine according to the invention.
Figure 2:
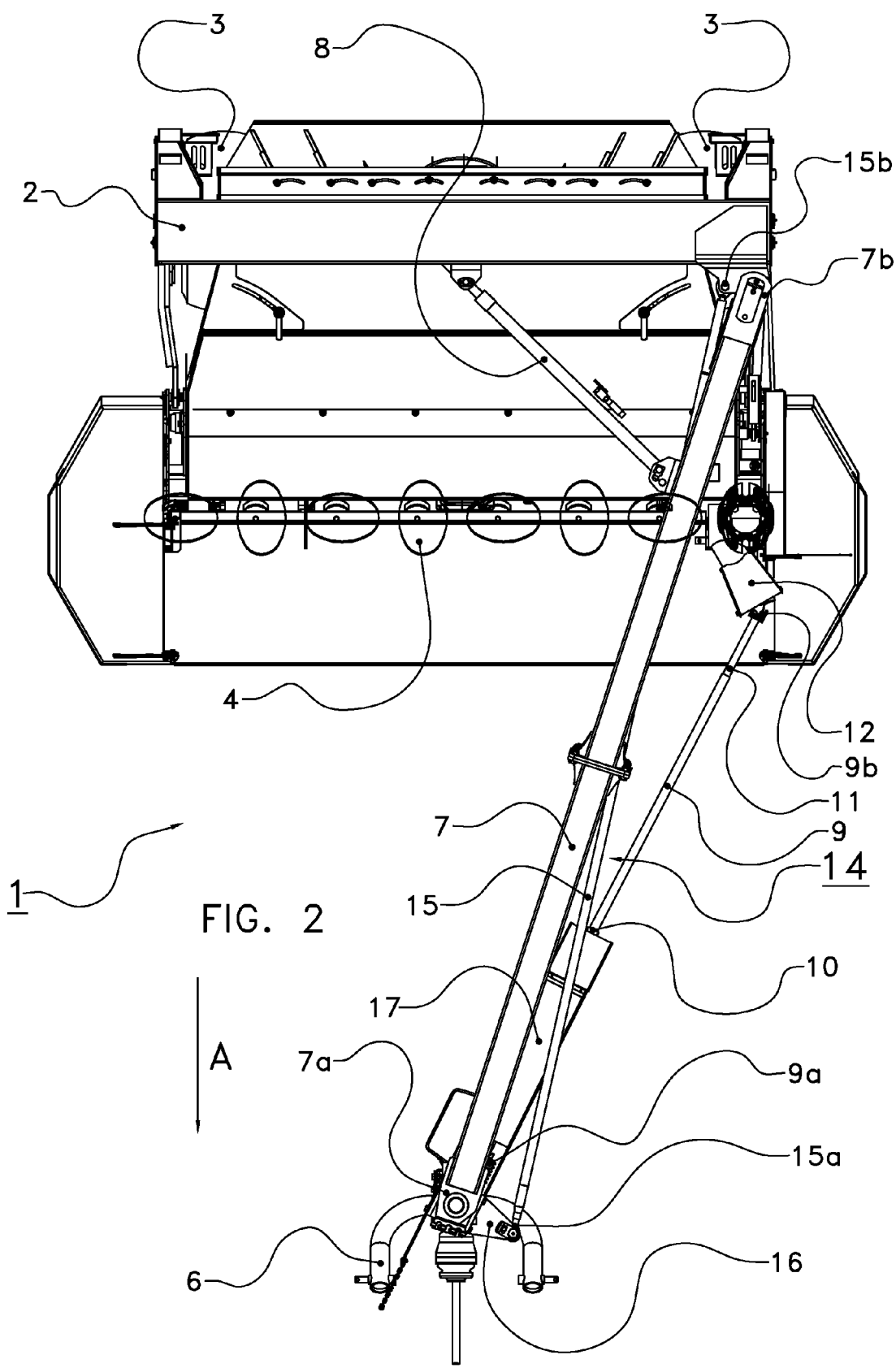
FIG. 2 shows a top view of the agricultural machine of FIG. 1 in transport position.
Figure 3:
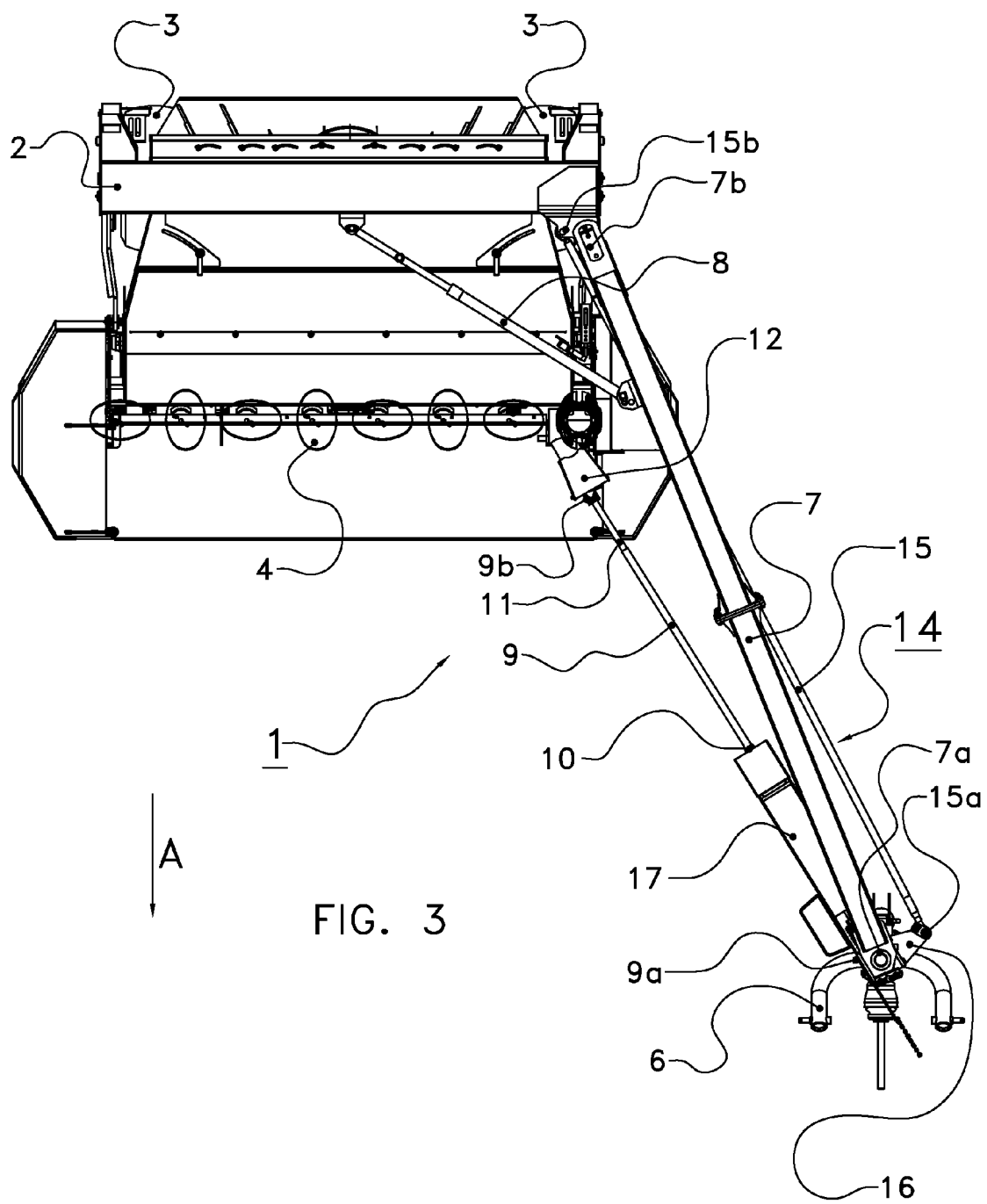
FIG. 3 shows a top view of the agricultural machine of FIG. 1 in an operative position.

The following is a description of certain embodiments of the invention, given by way of example only and with reference to the drawings. FIGS. 1, 2 and 3 show an embodiment of an agricultural machine 1, in particular a mower, according to the invention, designated as a whole by reference numeral 1. The agricultural machine 1 is configured to be fastened with its front end to a (non-shown) tractor or other pulling vehicle in order to be moved in a customary direction of travel A.

The agricultural machine 1 comprises a frame 2 which is supported by a number of wheels 3. A mowing device 4 is suspended from the frame 2. The mowing device 4 is movable with respect to the frame 2, so that said mowing device 4 can be brought into different positions with respect to the frame 2 by means of the hydraulic lift cylinder 5. For example, the mowing device 4 will be placed in a relatively high position during transport, while the mowing device 4 will be placed near the ground for mowing a crop. Such mowing devices 4 are known per se and will not be set out here in further detail.

The agricultural machine 1 is to be fastened to a tractor by means of a fastening device 6. The fastening device 6 hingeably supports a first end 7a of a drawbar 7. The second end 7b of the drawbar 7 is hingeably fastened to the frame 2. The frame 2 and therewith the mowing device 4 can be pulled by the tractor by means of the drawbar 7.

A hydraulic cylinder 8 is provided between the frame 2 and the drawbar 7. By actuating the hydraulic cylinder 8 the drawbar 7 can be placed in different positions with respect to the frame 2. As a result, the mowing device 4 will assume a different position with respect to the tractor. In particular, it is possible to displace the implement in lateral direction, i.e. substantially perpendicular to the direction of travel A, between a transport position in which the implement is located substantially straight behind the fastening device 6 (FIG. 2) and an operative position in which the implement is located substantially laterally of the fastening device 6 (FIG. 3). It is also possible to place the implement in positions between these two extreme positions.

A telescopic drive shaft 9 for driving the mowing device 4 is provided between the fastening device 6 and the mowing device 4. The telescopic drive shaft 9 comprises a first shaft part 10 and a second shaft part 11. The first shaft part 10 comprises a first shaft end 9a which is hingeably fastened to the fastening device 6 and which can be coupled to a drive of the tractor. The second shaft part 11 comprises a second shaft end 9b which is hingeably fastened to a coupling 12 provided on the mowing device 4. The coupling 12 is preferably a wide-angle coupling which allows the mowing device 4 to be driven at different orientations of the drive shaft 9 with respect to the coupling 12.

The first shaft part 10 comprises a cylindrical cavity in which the second shaft part 11 is enclosed so as to be shiftable in longitudinal direction. By the possible movement of the second shaft part 11 with respect to the first shaft part 10 the change in length of the drive shaft 9 during the displacement of the frame 2, for example from the transport position to the operative position, can be compensated.

It is pointed out here that the second shaft part is flexible and/or is fastened with some clearance to the mowing device 4 in order to enable movements of the mowing device 4. It is further pointed out that the first shaft part 10 and the second shaft part 11 may consist of a plurality of components which may possibly also have different orientations with respect to each other.

In order to ensure that the drive shaft 9 remains operative during the changing of the lateral position of the mowing device with respect to the fastening device 6, for example from the operative position to the transport position, there is provided a steering device 14 which is configured to direct the first shaft part 10 to the second shaft end 9b, so that the first shaft part 10 and the second shaft part 11 remain located in the same plane, i.e. that the first shaft part 10 and the second shaft part 11 are in alignment with each other in a proper manner.

The steering device 14 comprises a steering rod 15 which is fastened with a first steering rod end 15a to an arm 16, and with a second steering rod end 15b to the frame 2. The arm 16 is disposed on a support 17 of the first shaft part 10 and extends substantially perpendicular to the longitudinal direction of the drive shaft 9.

When the mowing device 4 is now displaced in lateral direction by actuating the hydraulic cylinder 8, the steering rod 15 will adjust the orientation of the first shaft part 10 so that the latter remains directed to the second shaft end 9b in such a manner that the first shaft part 10 and the second shaft part 11 remain located substantially in a vertical plane. By the co-rotation of the first shaft part 10 by means of the steering device 14, the drive shaft 9 remains operative in different positions of the mowing device 4 with respect to the fastening device 6, and the mowing device can be used in these different positions and during the displacement of the mowing devices between the different positions.

In this case, the fastening point of the second end 7b of the drawbar 7 is located near the rear side of the agricultural machine, which has a favourable effect on the stability of the machine.

In an alternative embodiment of the steering device, the steering device comprises a steering rod and a steering yoke. The steering yoke comprises a first yoke arm and a second yoke arm, and a hinge point between the two yoke arms. At the hinge point the steering yoke is hingeably fastened to the drawbar 7. Furthermore, the first yoke arm is hingeably fastened to the support 17 of the first shaft part 10 and the second yoke arm is hingeably coupled to the first steering rod end of the steering rod. The second steering rod end is hingeably fastened to the frame 2. With such a steering device it is possible to keep the first shaft part directed to the first shaft end.

Other embodiments of the steering device can also be applied in order to keep the first shaft part 10 directed to the second shaft end 9b of the drive shaft 9.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural machine comprising:
   an arm disposed on a support,
   a fastening device attached to the arm configured for fastening to a pulling vehicle in order to move the agricultural machine in a customary direction of travel,
   a frame,
   an implement fastened to the frame, an elongate drawbar having a first end that is hingeably fastened to the fastening device and a second end that is hingeably fastened to the frame, and an actuator fastened to the frame and to the drawbar, in order to move the frame between at least a transport position in which the frame is located at least partly behind the fastening device in the customary direction of travel and an operative position in which the frame is located laterally of the fastening device in the customary direction of travel, a telescopic drive shaft having a first shaft end and a second shaft end, wherein the first shaft end is hingeably fastened to the fastening device and the second shaft end is hingeably fastened to a coupling of the implement, the telescopic drive shaft comprising:

a first shaft part wherein the support forms part of the first shaft part, and a second shaft part that is movable with respect to the first shaft part, a steering device configured to direct the first shaft part of the telescopic drive shaft substantially to the second shaft end of the telescopic drive shaft; wherein the steering device comprises a steering rod which is hingeably fastened with a first steering rod end to the support of the first shaft part, and wherein the steering rod is hingeably fastened with a second steering rod end to the frame.

2. The agricultural machine according to claim 1, wherein the arm extends at least partly perpendicular to the longitudinal centre line of the drive shaft.

3. The agricultural machine according to claim 2, wherein the arm is positioned near the first shaft end.

4. The agricultural machine according to claim 1, wherein, when viewed in the customary direction of travel, a drawbar fastening location of the second end of the drawbar on the frame is situated behind a fastening location of the second shaft end on the implement.

5. The agricultural machine according to claim 1, wherein the first shaft part comprises a hollow cylinder in which the second shaft part is at least partly enclosed so as to be shiftable in longitudinal direction.

6. The agricultural machine according claim 1, wherein the implement is suspended from the frame.

7. The agricultural machine according to claim 1, wherein the implement is movable in a vertical direction with respect to the frame.

8. The agricultural machine according to claim 1, wherein the implement is a mowing device.

9. The agricultural machine according to claim 1, wherein the frame comprises a wheel set for supporting the frame.

10. The agricultural machine according claim 1, wherein the actuator is a hydraulic cylinder.

* * * * *